(12) United States Patent
Nebeker

(10) Patent No.: US 7,572,044 B2
(45) Date of Patent: Aug. 11, 2009

(54) EMERGENCY LIGHT BAR MOUNTING ASSEMBLY ROTATABLE BETWEEN A HORIZONTAL DEPLOYED POSITION AND A VERTICAL STOWED POSITION

(76) Inventor: Philip D. Nebeker, 949 S. 200 East, Orem, UT (US) 84058

( * ) Notice: Subject to any disclaimer, the term of this patent is extended or adjusted under 35 U.S.C. 154(b) by 356 days.

(21) Appl. No.: 11/268,305

(22) Filed: Nov. 7, 2005

(65) Prior Publication Data
US 2007/0102609 A1 May 10, 2007

(51) Int. Cl.
*B60Q 1/26* (2006.01)
(52) U.S. Cl. ........................ 362/542; 362/526
(58) Field of Classification Search ............ 362/542 X, 362/526, 528, 428; 224/282, 309, 321, 329, 224/402, 549
See application file for complete search history.

(56) References Cited
U.S. PATENT DOCUMENTS
3,783,267 A * 1/1974 Thomas ...................... 362/523
4,192,427 A * 3/1980 Bergman ..................... 212/271
4,692,845 A * 9/1987 Widhalm et al. ............ 362/485

* cited by examiner

*Primary Examiner*—Gwendolyn Baxter
(74) *Attorney, Agent, or Firm*—Angus C. Fox, III

(57) ABSTRACT

An emergency light bar mounting assembly for either trucks without a cargo box that extends vertically above the level of the cab, or for trucks having a bed that is lower than the cab, provides additional vertical clearance for the vehicle when needed, by having an emergency light bar mounting platform hinged to an immovable horizontal frame member. The mounting platform is rotated to a horizontal position when the light bar is in use, but rotated to a vertical position when greater vertical clearance is needed for the vehicle on which it is mounted. When the mounting platform is vertically positioned, the contribution of the emergency light bar to the height of the vehicle is completely eliminated. Rotational movement of the mounting platform is accomplished using an electric, hydraulic, pneumatic or manual drive system.

20 Claims, 5 Drawing Sheets

EMERGENCY LIGHT BAR MOUNTING ASSEMBLY ROTATABLE BETWEEN A HORIZONTAL DEPLOYED POSITION AND A VERTICAL STOWED POSITION

BACKGROUND OF THE INVENTION

1. Field of the Invention

The invention relates generally to hydratable apparatus for mounting emergency or caution light bars on the cab of a truck, and more particularly, to a light bar support which may be raised or lowered to adjust the vertical profile of the vehicle on which it is mounted.

2. History of the Prior Art

Tow trucks and construction pickup trucks used highways, as well as police pickup trucks used for pursuit work, must be equipped with an overhead flashing light bar so that they can be seen by approaching traffic when they are being driven slowly, parked on the shoulder of a highway or street, or (in the case of police vehicles) being used in a pursuit mode. One of the problems associated with having a light bar installed on a level where it can be seen from all directions is that vertical clearances, particularly in parking garages, may be severely limited. In other words, a truck equipped with a non-retractable light bar may not be able to enter the parking garage. Although low profile light bars having a high of only about two inches (roughly 51 mm) are now available, that height may be just enough of an addition on a high-profile vehicle, to make the vehicle unable to enter low parking garages that are designed primarily for conventional automobiles and normal-height pickup trucks and vans.

While a variety of devices has been developed for the elevation of individual light fixtures above the roof level of a motor vehicle, they are generally inadequate for use with modern light bars. Some of these known devices use telescoping tubes to support a single light fixture at varying heights. Such telescoping arrangements are neither strong enough to support a light bar nor permissive of the minimal elevations desired in the lower nonemergency or transport position. Other such devices use end pivot arrangements which are not of sufficient strength to dependably support a modern light bar and furthermore generally rotate the light fixture from a horizontal to a vertical condition as the pivoting arm of the device rotates from horizontal to vertical.

U.S. Pat. No. 5,558,424 to Stephen J. Zeligson discloses an emergency vehicle light bar mounting assembly that employs first and second connected and substantially horizontal elongated frames mounted transversely across the upper surface of an emergency vehicle. The connecting assembly is such that the second frame may be substantially continuously vertically displaced while maintaining parallel relationship of the frames so that the emergency indicating equipment fixed atop the second frame maintains its operational attitude regardless of the elevation to which the second frame is raised. Reciprocable operation of the connecting assembly is accomplished with an electric, hydraulic, pneumatic or manual drive system. Although this mounting assembly has the capability of raising and lowering a light bar, it still may not provide a sufficiently low profile for a vehicle to enter a parking garage having a particularly low vertical clearance. This is especially true if the mounting assembly and light bar are installed on a heavy-duty truck, which already has a relatively high vertical profile.

What is needed, therefore, is an emergency light bar mounting assembly that will allow the light bar to be retracted to a level that will provide maximum vertical clearance so that the vehicle may have expanded access to covered facilities having minimal vertical clearances.

SUMMARY OF THE INVENTION

The present invention provides an emergency light bar mounting assembly for trucks having a cab and a bed that is lower than the cab. The mounting assembly provides additional vertical clearance for the vehicle when needed, by having an emergency light bar mounting platform hinged to an immovable horizontal frame member. The mounting platform is rotated to a horizontal position when the light bar is in use, but rotated to a vertical position when greater vertical clearance is needed for the vehicle on which it is mounted. When the mounting platform is vertically positioned, the contribution of the emergency light bar to the height of the vehicle is completely eliminated. Rotational movement of the mounting platform is accomplished using an electric, hydraulic, pneumatic or manual drive system.

For a preferred embodiment of the invention, the horizontal frame member is a square mild steel or stainless steel tube having 2-inch by 2-inch outside dimensions and a wall thickness of ⅛ inch. Alternatively, square tubes made of other metals and alloys, such as chrome molybdenum alloy steel, aluminum, or magnesium may be used. Wall thickness of the tube may be adjusted to compensate for the strengths of the actual material used. The horizontal frame member is rigidly secured to struts that are rigidly secured to the bed of the truck. The mounting platform is a mild steel or stainless steel tube of rectangular cross section having 2-inch by 8-inch outside dimensions and a wall thickness of ⅛ inch. Other metals and metal alloys may also be substituted for the presently preferred materials. The square tube horizontal frame member and the mounting platform are each interconnected to the other along the lengths of adjacent lower edges with a stainless steel piano hinge. Also for a preferred embodiment of the invention, a trim cover plate may be secured to each end of the horizontal frame member.

BRIEF DESCRIPTION OF THE PHOTOGRAPHS

DETAILED DISCLOSURE OF THE INVENTION

The fold-down emergency light bar support will now be described with reference to the attached drawing figures. It should be understood that they are not necessarily drawn to scale, but are intended to be merely illustrative of the invention and its operation.

Figure 1:
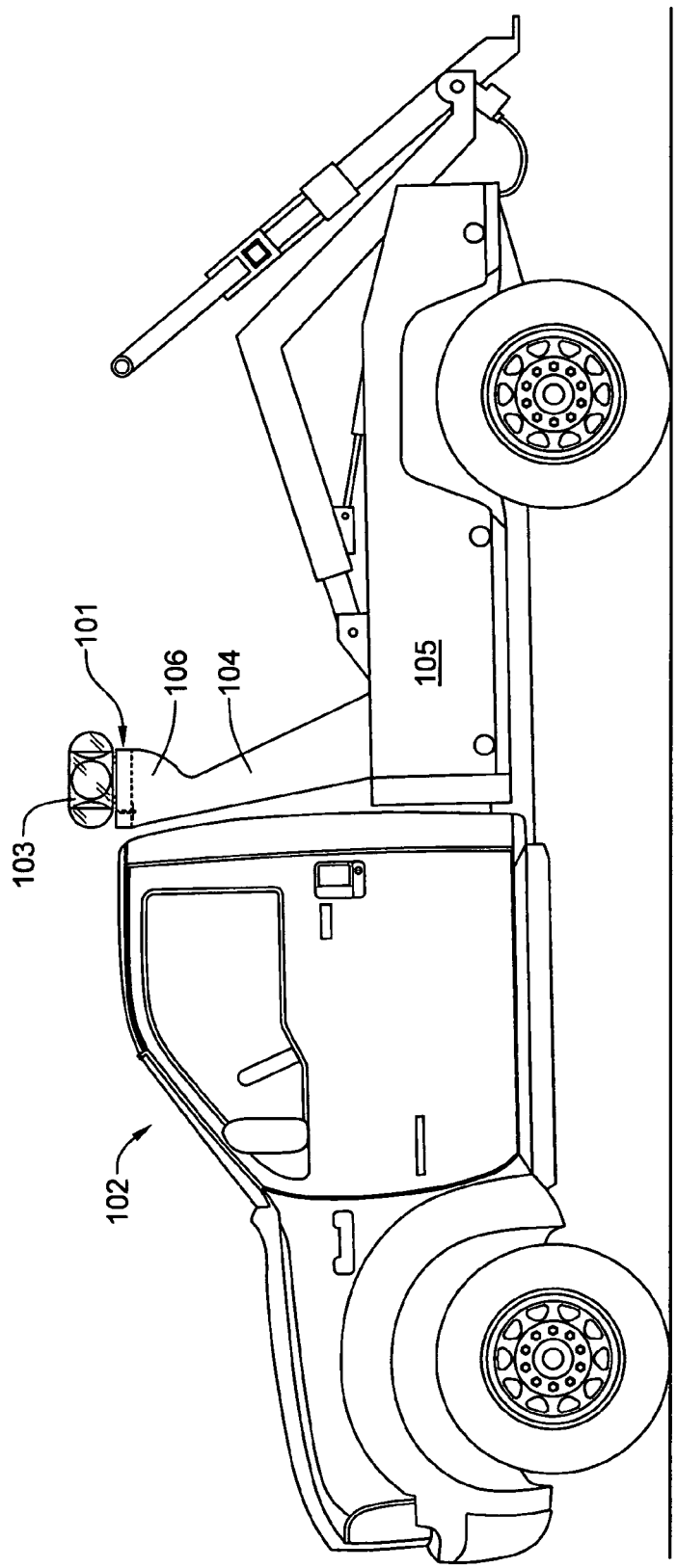
FIG. 1 is a side elevational view of the fold-down emergency light bar support with an emergency light bar affixed thereto, all mounted on a representative tow truck, in a deployed configuration.

Referring now to FIG. 1, the fold-down emergency light bar support 101, which has been installed on a tow truck 102, is shown in a deployed configuration. In the deployed configuration, the emergency light bar 103, which is secured to the fold-down emergency light bar support 101, is positioned in a horizontal attitude so that it can be seen by traffic approaching from any angle. The ends of a non-movable portion (the horizontal frame member more clearly visible in FIG. 3) of the light bar support 101 is rigidly affixed to the struts 104, which are rigidly affixed to the bed 105 of the tow truck 102.

Figure 2:
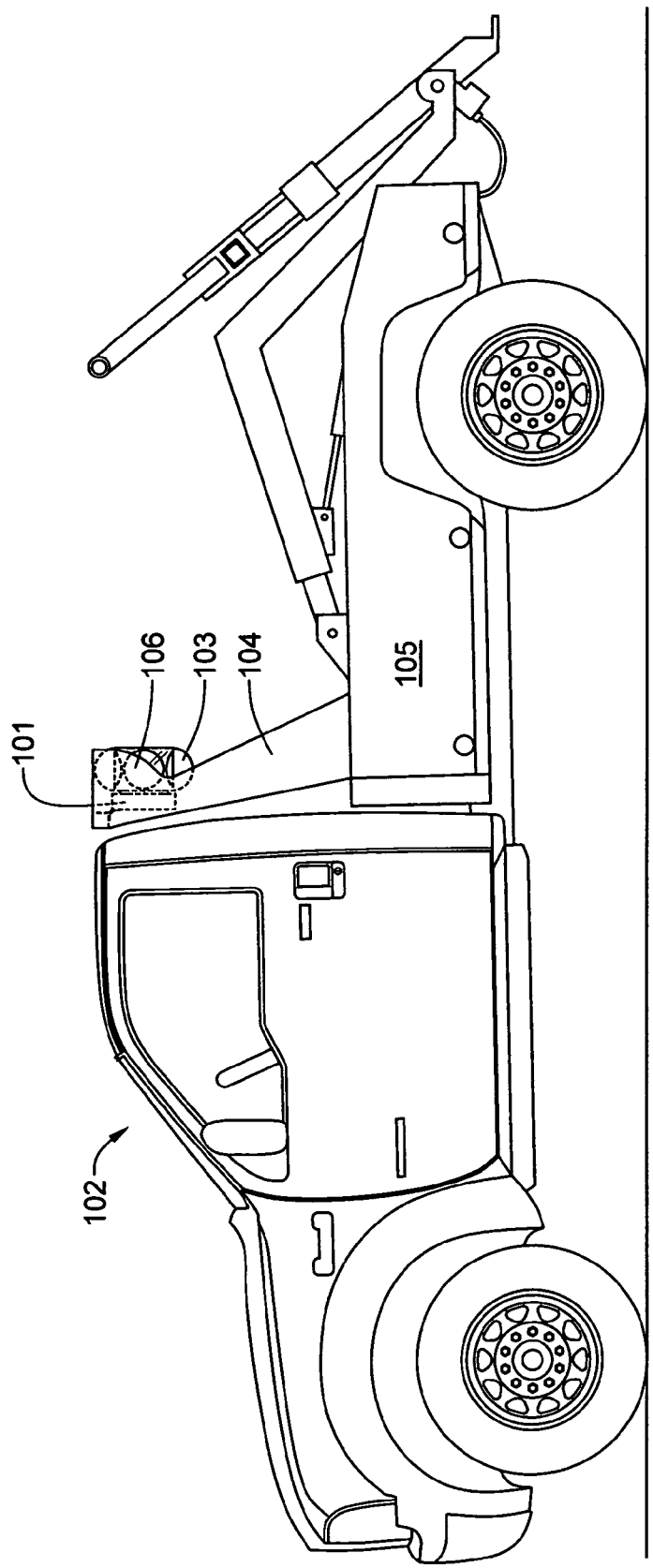
FIG. 2 is a side elevational view of the fold-down emergency light bar support with an emergency light bar affixed thereto, all mounted on a representative tow truck, in an undeployed configuration.

Referring now to FIG. 2, the fold-down emergency light bar support 101 is shown in an undeployed configuration. In the undeployed configuration, the emergency light bar 103 is positioned in a generally vertical attitude behind the cab. In this configuration, the contribution of the emergency light bar 103 to the height of the tow truck 102 is completely eliminated. Also in the undeployed configuration, the light bar 103 is protected from airborne gravel and sand which may strike the front surfaces of the tow truck 102. It will be noted that the struts 104 incorporate a shield portion 105, which fully shields the ends of the fold down portion of the emergency light bar support 101, thereby eliminating the risk of amputation to fingers and the like as the emergency light bar 103 is lowered.

Figure 3:
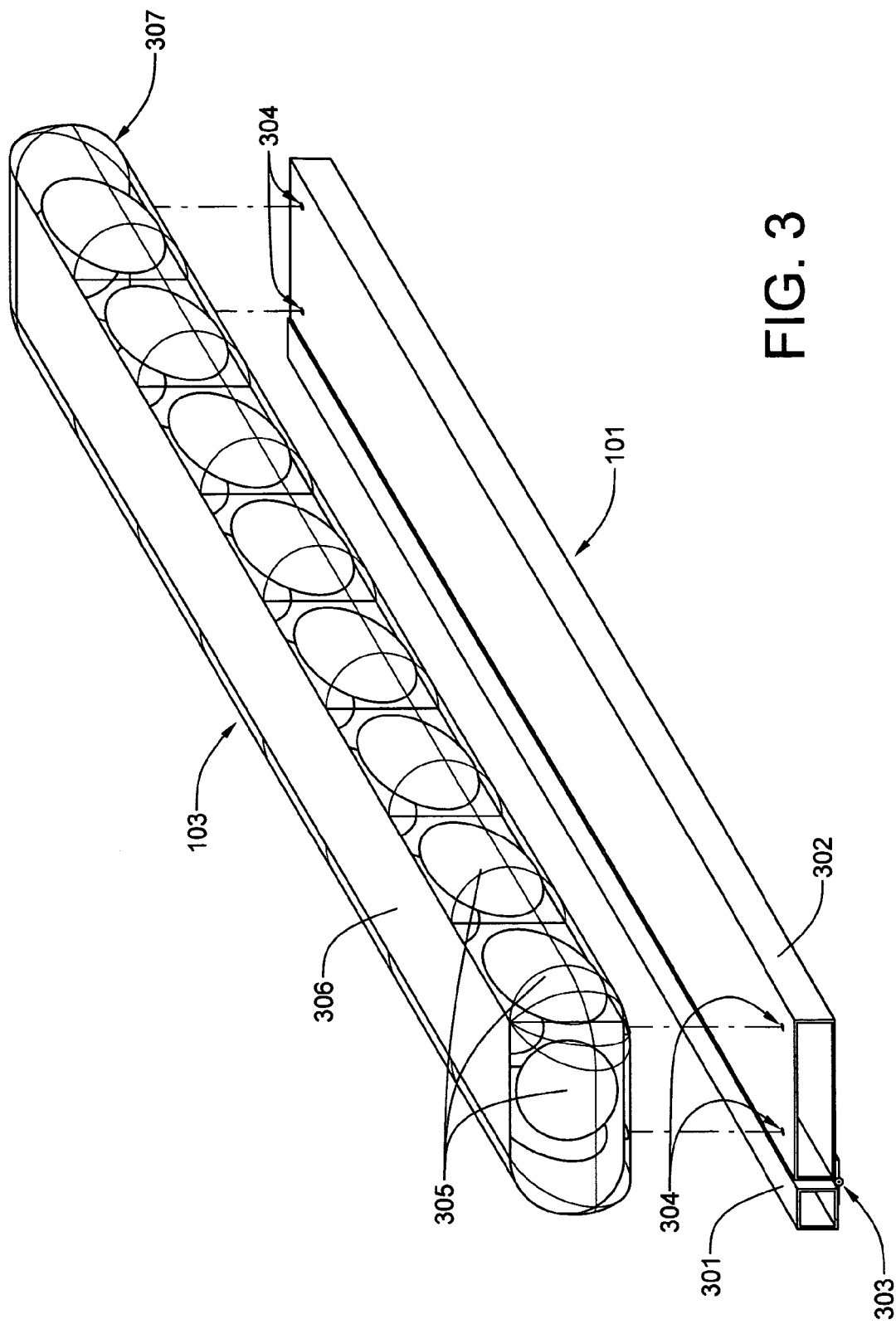
FIG. 3 is an exploded isometric view of the fold-down emergency light bar support with a representative emergency light bar shown positioned above the mounting location on the support.

Referring now to FIG. 3, the fold-down emergency light bar support 101 includes a horizontal frame member 301 that is rigidly secured to the bed or frame of the tow truck 102. A mounting platform 302 is hingeably connected to the horizontal frame member 301 preferably via a single stainless steel piano hinge 303, although multiple gate or door hinges may be used as well. For a preferred embodiment of the invention, the horizontal frame member 301 is a square mild steel or stainless steel tube having 2-inch by 2-inch outside dimensions and a wall thickness of about ⅛ inch. Alternatively, square tubes made of other metals and alloys, such as chrome molybdenum alloy steel, aluminum, or magnesium may be used. Wall thickness of the tube may be adjusted to compensate for the strengths of the actual material used. The horizontal frame member is rigidly secured to struts that are rigidly secured to the bed of the truck. The mounting platform 302 is a mild steel or stainless steel tube of rectangular cross section having 2-inch by 8-inch outside dimensions and a wall thickness also of about ⅛ inch. Other metals and metal alloys may also be substituted for the presently preferred materials.

Still referring to FIG. 3, it will be noted that the emergency light bar 103 can be attached directly to the mounting platform 302 with threaded fasteners, such as small bolts or machine screws (not shown), which pass through the mounting apertures 304. Although it should be understood that no attempt has been to provide an accurate drawing of an actual emergency light bar assembly, the drawing does show that the emergency light bar assembly is equipped with multiple light sources 305 (in this case, eight on a side and one at each end thereof, the colors of which may be selected for a particular application. The emergency light bar 103 includes a housing 306 that is sealed to prevent the entrance of moisture, dust, dirt and sand. The side walls 307 of the housing 306, which are curved to enhance strength and reduce wind resistance, are made of a tough transparent polymeric material, such as polycarbonate, so that light emitted by the multiple light sources can be seen by the drivers of other vehicles approaching from all directions.

Figure 4:
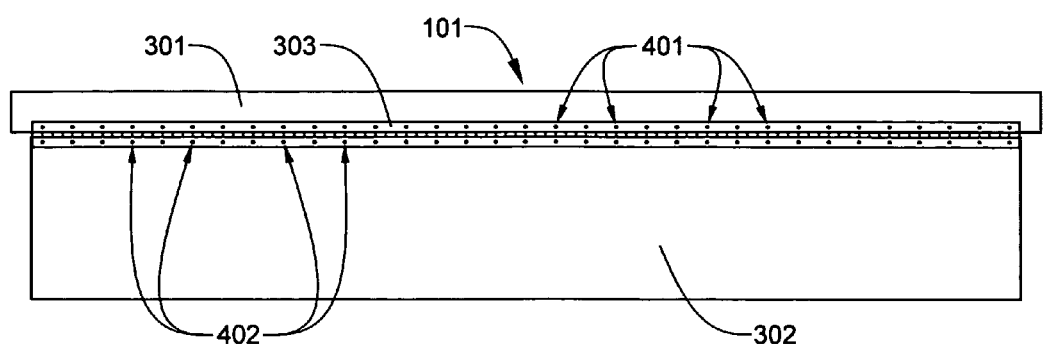
FIG. 4 is a bottom plan view of the fold-down emergency light bar support.

Referring now to FIG. 4, in this bottom view of the fold-down emergency light bar support 101, the piano hinge 303 is visible. It has been spot welded to both the horizontal frame member 301 and the mounting platform 302. Thirty-three spot welds 401 connect the piano hinge 303 to the horizontal frame member 301 and thirty-three spot welds 402 connect it to the mounting platform 302. In this drawing, it will be noted that the horizontal support member 301 is longer than the mounting platform 302. As most standard emergency light bars are 48 inches in length, the mounting platform is also about 48 inches in length. So that the ends of the opposite ends of the horizontal frame member 301 may be secured to the struts 104 of the tow truck 102 or other vehicle, the frame member is sized so that it is longer than the mounting platform 302. In this case, it is no more than 2 inches longer, and the mounting platform 302 is centered along its length.

Figure 5:
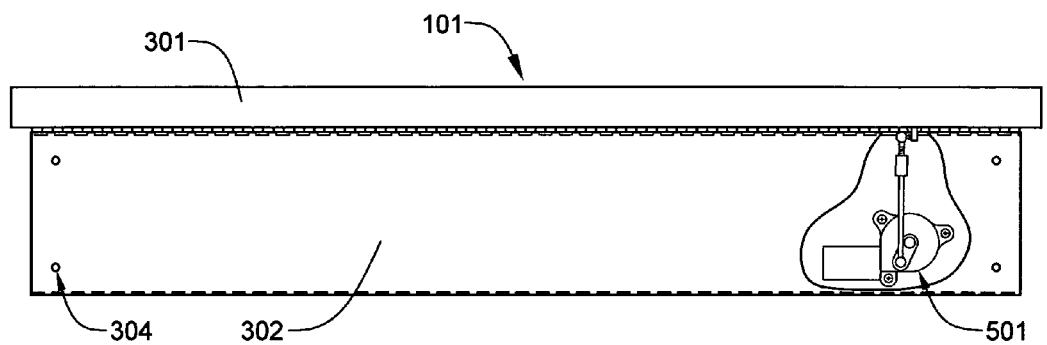
FIG. 5 is a top plan, partial cut-away view of the fold-down emergency light bar support, showing a first embodiment actuation mechanism employing an electric motor.

Referring now to FIG. 5, a first embodiment actuation mechanism employing an electric motor and worm gear drive assembly 501 is shown. The details of this arrangement are more clearly visible in the enlarged drawing of FIG. 7.

Figure 6:
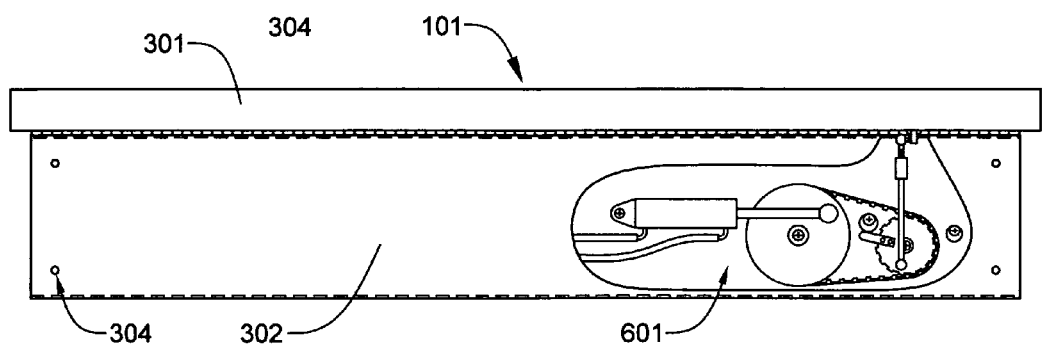
FIG. 6 is a top plan, partial cut-away view of the fold-down emergency light bar support, showing a second embodiment actuation mechanism employing an hydraulic or pneumatic cylinder.

Referring now to FIG. 6, a second embodiment actuation mechanism employing an hydraulic or pneumatic cylinder 601 is shown. The details of this arrangement are more clearly visible in the enlarged drawing of FIG. 8.

Figure 7:
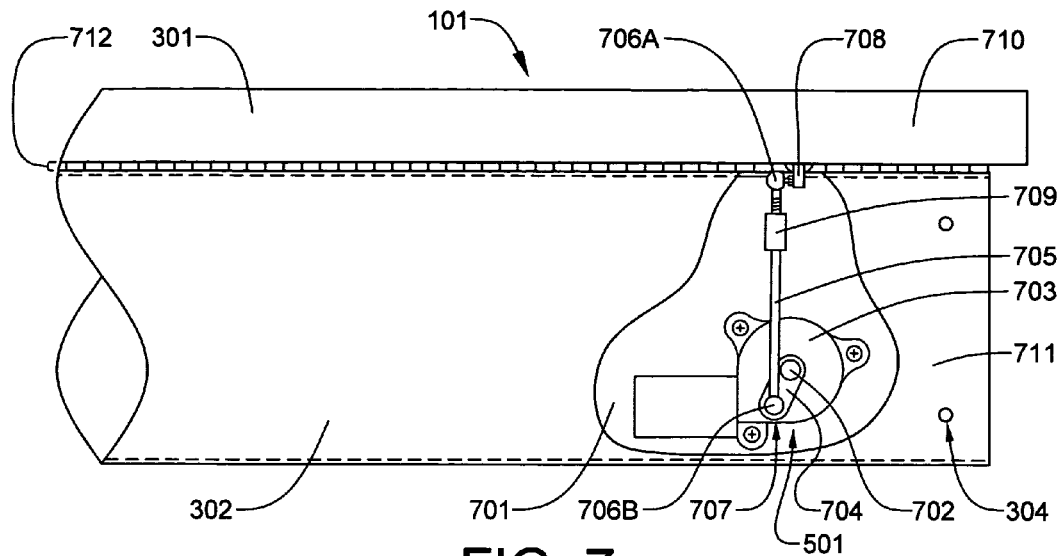
FIG. 7 is an enlarged partial top plan, partial cut-away view of the fold-down emergency light bar support, showing more clearly the first embodiment actuation mechanism.

Referring now to FIG. 7, the electric motor and worm gear drive assembly 501 is similar to those which are commonly used to raise and lower headlight assemblies on vehicles, such as sports cars, which may have retractable headlight assemblies. The drive assembly 501 is anchored to the lower inner surface 701 of the mounting platform 302. A rotating shaft 702 on the worm gear drive 703 of the drive assembly 501 moves an arm 704 through an arcuate range of motion. A linkage rod 705, having first and second ball-joint sockets 706A and 706B at opposite ends thereof, connects to a first ball-joint ball (not shown) affixed to the outer end 707 of arm 704 and a second ball-joint ball (also not shown) rigidly affixed to a support bracket 708 that is welded to the horizontal frame member 301. The linkage rod 705 can be adjusted in length at threaded joint 709 so that the upper surfaces 710 and 711 of the horizontal frame member 302 and mounting platform 302, respectively, lie in a common plane when the fold-down emergency light bar support 101 is in a deployed configuration. For a preferred embodiment of the invention, a strip of resilient material (not shown is attached to either the horizontal frame member 301 or to the mounting platform 302 within the gap 712 between the two so the strip of resilient material will be compressed when the folding emergency light bar support 101 is in a deployed configuration, thereby preventing the various components from rattling. It is well known in the art that a worm gear drive is self locking. Thus, once the folding emergency light bar support 101 is placed in the deployed configuration, it will not tend to gradually slip to the undeployed configuration.

Figure 8:
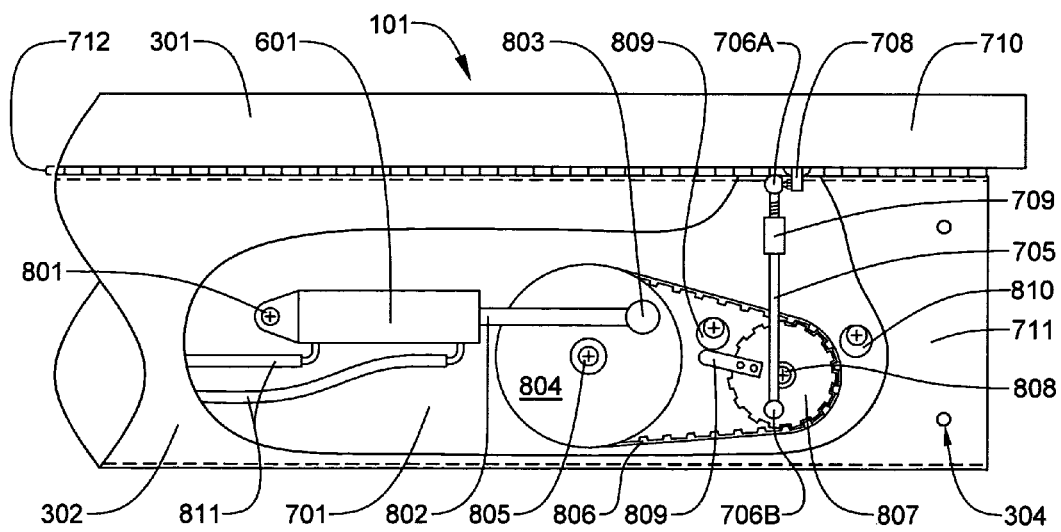
FIG. 8 is an enlarged partial top plan, partial cut-away view of the fold-down emergency light bar support, showing more clearly the second embodiment actuation mechanism.

Referring now to FIG. 8, an hydraulic or pneumatic cylinder 601 is used to raise and lower the mounting platform 302. The cylinder 601 is pivotally attached to the lower inner surface 701 of mounting platform 302 with a shoulder bolt or screw 801. The plunger arm 802 of the cylinder 601 is coupled with a ball joint connection 803 to a first toothed sprocket 804

(the teeth are not visible on this sprocket), which is rotatably anchored through its central axis to the lower inner surface 701 of the mounting platform 302 with a first attachment bolt or screw 805. A reinforced rubber drive belt 806 rotatably couples the first toothed sprocket 804 to a second toothed sprocket 807, which is rotatably anchored through its central axis to the lower inner surface 701 of the mounting platform 302 with a second attachment bolt or screw 808. The second toothed sprocket 807 is of smaller diameter than the first toothed sprocket 804, so that rotary motion of the first sprocket 804 is multiplied in the second sprocket 807. A linkage rod 705, having first and second ball-joint sockets 706A and 706B at opposite ends thereof, connects to a first ball-joint ball (not shown) affixed to the second toothed sprocket 804 and to a second ball-joint ball (also not shown) rigidly affixed to a support bracket 708 that is welded to the horizontal frame member 301. The linkage rod 705 can be adjusted in length at threaded joint 709 so that the upper surfaces 710 and 711 of the horizontal frame member 301 and mounting platform 302, respectively, lie in a common plane when the fold-down emergency light bar support 101 is in a deployed configuration. For a preferred embodiment of the invention, a strip of resilient material (not shown is attached to either the horizontal frame member 301 or to the mounting platform 302 within the gap 512 between the two so the strip of resilient material will be compressed when the folding emergency light bar support 101 is in a deployed configuration, thereby allowing an over-center feature to lock the mounting platform 302 in either an up or down position. The over-center feature is provided by a stop arm 808 that is spot welded to the second sprocket 807. The stop arm moves against an eccentrically adjustable up stop 809 when the emergency light bar 103 is in a deployed configuration and against an eccentrically adjustable down stop 810 when the emergency light bar 103 is in an undeployed configuration. It will be noted that hydraulic or pneumatic lines 811 are routed to the hydraulic or pneumatic cylinder 601.

Although only several embodiments of the present invention have been disclosed herein, it will be obvious to those having ordinary skill in the art that changes and modifications may be made thereto without departing from the scope and spirit of the invention as hereinafter may be claimed.

What is claimed is:

1. An emergency light bar support for a truck having a cab and a chassis, said light bar support comprising:
    a horizontal frame member rigidly mounted to the truck chassis at a level no lower than an uppermost point of the cab;
    a mounting platform longitudinally hinged to the horizontal frame member, said mounting platform providing a mounting surface for an emergency light bar, said mounting surface having a generally horizontal deployed position and a generally vertical undeployed position behind the cab;
    means for raising and lowering said mounting platform.

2. The emergency light bar support of claim 1, wherein said horizontal frame member is a length of square-tube structural metal stock.

3. The emergency light bar support of claim 2, wherein said mounting platform is a length of structural metal tube stock of rectangular cross section.

4. The emergency light bar support of claim 1, wherein said means for raising and lowering said mounting platform is an electric motor affixed to the mounting platform that is coupled to a worm gear drive, said worm gear drive coupled to an arm movable through an arc of no more than 180 degrees, said arm being coupled to the horizontal frame member by at least one linkage rod.

5. The emergency light bar support of claim 1, wherein said means for raising and lowering said mounting platform is a piston bidirectionally movable within a cylinder attached to the mounting platform by a pressurized substance selected from the group consisting of pressurized gases and pressurized fluids, said piston coupled to said horizontal frame member through an actuation mechanism that attains an over-center state when the mounting platform is in a deployed position.

6. The emergency light bar support of claim 5, wherein said actuation mechanism converts generally linear motion of the piston to rotary motion.

7. The emergency light bar support of claim 1, wherein said horizontal frame member and said mounting platform are hingeably coupled with a piano hinge that extends substantially an entire length of said mounting platform.

8. An emergency light bar support for a truck having a cab and a chassis, said light bar support comprising:
    a horizontal frame member rigidly mounted to the truck chassis at a level no lower than an uppermost point of the cab;
    a mounting platform longitudinally hinged to the horizontal frame member, said mounting platform providing a mounting surface for an emergency light bar at an elevation where said emergency light bar can be seen from in front of the truck, behind the truck and to each side of the truck, said mounting surface having a generally horizontal deployed position rearward of the cab, and a generally vertical undeployed position behind the cab, wherein at least a major portion of said mounting platform is below the level of the uppermost point of the cab; and
    means for raising and lowering said mounting platform.

9. The emergency light bar support of claim 8, wherein said horizontal frame member and said mounting platform are hingeably coupled with a piano hinge that extends substantially an entire length of said mounting platform.

10. The emergency light bar support of claim 8, wherein said horizontal frame member is a length of square-tube structural metal stock.

11. The emergency light bar support of claim 10, wherein said mounting platform is a length of structural metal tube stock of rectangular cross section.

12. The emergency light bar support of claim 8, wherein said means for raising and lowering said mounting platform is an electric motor affixed to the mounting platform that is coupled to a worm gear drive, said worm gear drive coupled to an arm movable through an arc of no more than 180 degrees, said arm being coupled to the horizontal frame member by at least one linkage rod.

13. The emergency light bar support of claim 8, wherein said means for raising and lowering said mounting platform is a piston bidirectionally movable within a cylinder attached to the mounting platform by a pressurized substance selected from the group consisting of pressurized gases and pressurized fluids, said piston coupled to said horizontal frame member through an actuation mechanism that attains an over-center state when the mounting platform is in a deployed position.

14. The emergency light bar support of claim 13, wherein said actuation mechanism converts generally linear motion of the piston to rotary motion.

15. An emergency light bar support for trucks having a cab, a bed lower than the cab, and a chassis, as well as for trucks having a cab, a cargo box lower than the cab, and a chassis, said light bar support comprising:

a horizontal frame member rigidly mounted to the truck chassis at a level no lower than an uppermost point of the cab;

a mounting platform longitudinally hinged to the horizontal frame member, said mounting platform providing a mounting surface for an emergency light bar, said mounting surface having a generally horizontal deployed position rearward of the cab, and a generally vertical undeployed position both rearward and largely behind the cab; and means for raising and lowering said mounting platform.

16. The emergency light bar support of claim 15, wherein said horizontal frame member is a length of square-tube structural metal stock.

17. The emergency light bar support of claim 16, wherein said mounting platform is a length of structural metal tube stock of rectangular cross section.

18. The emergency light bar support of claim 15, wherein said means for raising and lowering said mounting platform is an electric motor affixed to the mounting platform that is coupled to a worm gear drive, said worm gear drive coupled to an arm movable through an arc of no more than 180 degrees, said arm being coupled to the horizontal frame member by at least one linkage rod.

19. The emergency light bar support of claim 15, wherein said means for raising and lowering said mounting platform is a piston bidirectionally movable within a cylinder attached to the mounting platform by a pressurized substance selected from the group consisting of pressurized gases and pressurized fluids, said piston coupled to said horizontal frame member through an actuation mechanism that attains an over-center state when the mounting platform is in a deployed position.

20. The emergency light bar support of claim 19, wherein said actuation mechanism converts generally linear motion of the piston to rotary motion.

* * * * *